INVENTOR.
RICHARD S. VAN de HOUTEN
BY
Raymond L Owens
ATTORNEY

Oct. 27, 1970   R. S. VAN DE HOUTEN   3,537,069
SYNCHRONIZERS EMPLOYING SEQUENTIAL PROBABILITY RATIO TESTS
Filed Oct. 2, 1967   4 Sheets-Sheet 4

TRUTH TABLE

| | $R_0$ | $R_1$ | $R_2$ | $R_3$ | $R_4$ | $R_5$ | $F_p$ | $F_n$ | -LIM | | X | Y | Z |
|---|---|---|---|---|---|---|---|---|---|---|---|---|---|
| +13 | | | | | | | | | | | | | |
| +12 | H | H | L | L | H | H | H | L | L | LOCK FOR +1 | L | H | L |
| +11 | L | L | H | L | H | H | H | L | H | | H | H | L |
| +10 | H | L | H | L | H | H | H | L | H | | H | H | L |
| +9 | L | H | H | L | H | H | H | L | H | | H | H | L |
| +8 | H | H | H | L | H | H | H | L | H | | H | H | L |
| +7 | L | L | L | H | H | H | H | L | H | | L | L | L |
| +6 | H | L | L | H | H | H | H | L | H | | L | L | L |
| +5 | L | H | L | H | H | H | H | L | H | | L | L | L |
| +4 | H | H | L | H | H | H | H | L | H | | L | L | L |
| +3 | L | L | H | H | H | H | H | L | H | | H | L | L |
| +2 | H | L | H | H | H | H | H | L | H | | H | L | L |
| +1 | L | H | H | H | H | H | H | L | H | | H | L | L |
| +0 | H | H | H | H | H | H | H | L | H | | H | L | L |
| -1 | L | L | L | L | L | L | L | H | H | | L | L | L |
| -2 | H | L | L | L | L | L | L | H | H | | L | L | L |
| -3 | L | H | L | L | L | L | L | H | H | | L | L | L |
| -4 | H | H | L | L | L | L | L | H | H | | L | L | L |
| -5 | L | L | H | L | L | L | L | H | H | | H | L | L |
| -6 | H | L | H | L | L | L | L | H | H | | H | L | L |
| -7 | L | H | H | L | L | L | L | H | H | | H | L | L |
| -8 | H | H | H | L | L | L | L | H | H | | H | L | L |
| -9 | L | L | L | H | L | L | L | H | H | | L | H | L |
| -10 | H | L | L | H | L | L | L | H | H | | L | H | L |
| -11 | L | H | L | H | L | L | L | H | H | | L | H | L |
| -12 | H | H | L | H | L | L | L | H | H | | L | H | L |
| -13 | L | L | H | H | L | L | L | H | L | LOCK FOR +1 OR -3 | H | H | L |
| -14 | H | L | H | H | L | L | L | H | H | | H | H | L |
| -15 | L | H | H | H | L | L | L | H | H | | H | H | L |

*FIG. 4.*

INVENTOR.
RICHARD S. VAN de HOUTEN
BY
Raymond L. Owens
ATTORNEY

United States Patent Office 3,537,069
Patented Oct. 27, 1970

3,537,069
SYCHRONIZERS EMPLOYING SEQUENTIAL PROBABILITY RATIO TESTS
Richard S. Van de Houten, Maitland, Fla., assignor to General Dynamics Corporation, a corporation of Delaware
Filed Oct. 2, 1967, Ser. No. 672,115
Int. Cl. H04l 7/04
U.S. Cl. 340—146.1                      14 Claims

ABSTRACT OF THE DISCLOSURE

A synchronizer is described which makes use of statistical analysis to extract a selected group of data bits as a sync signal (i.e. recurring signal with a predetermined pattern). The system includes a counter and a comparator to which input bits and reference bits are applied on a bit-by-bit basis. The count is adjusted between predetermined bounds depending upon results of comparison of each pair of bits by the comparator and the group is selected as the sync signal when the count corresponding to at least an upper bound is accumulated or rejected when the count corresponding to the lower bound is accumulated.

---

This invention generally relates to the synchronization of a transmitter and receiver of a data link, and is particularly directed to the method and apparatus for accurately extracting a recurring sync signal.

It is customary in binary data links to transmit synchronizing information in the form of unique digital words at regular intervals, so that a data handler at the receiver will always be held in step with a data source at the transmitter. Normally, sync signals are transmitted after each group of data bits. In some applications such as telemetry communication the sync signal is transmitted in a noisy background and so it is difficult to determine whether or not it has been received. Many different arrangements have been used in the past to recognize sync signals. Unfortunately, all these systems generally suffer from disadvantages such as being complex, requiring a relatively long time to recognize a sync signal or are inaccurate.

In view of the foregoing, it is an object of the invention to provide an improved method and apparatus for accurately and rapidly determining whether or not a received group of data bits is a synchronization pattern.

Another object of the invention is to provide synchronizers which effectively operate under adverse and varying noise conditions.

A further object of the invention is to provide synchronizers which operate with increased efficiency and which require a minimum of operator supervision.

A still further object of the invention is to provide a synchronizer which may be effectively incorporated into a PCM data transmission system.

Briefly, in accordance with one exemplary embodiment of the present invention, a comparison circuit serially compares on a bit-by-bit basis a selected group of received data bits against the predetermined pattern or format of a sync signal and advances the count stored in a counter by one for the bits which correspond and decreased it by a constant K for each incorrect comparison until the following inequality fails:

(1)                  $L_1 < \Sigma I + K \Sigma J < U_1$ wherein:

(2) $L_1$ (lower limit) is given by $$\frac{\ln\left(\frac{\beta_o}{1-\alpha_o}\right)}{\ln 2(1-\epsilon_o)}$$

(3) K is given by $$\frac{\ln 2\epsilon_o}{\ln 2(1-\epsilon_o)}$$

(a negative constant), (4) $U_1$ is given by $$\frac{\ln\left(\frac{1-\beta_o}{\alpha_o}\right)}{\ln 2(1-\epsilon_o)}$$

with $\alpha_o$ being the probability that the system will erroneously accept a false sync pattern and $\beta_o$ is the probability that the system will erroneously reject the correct sync pattern.

(5) $\Sigma J$ is the summation of all the compared bits in error, (6) $\Sigma I$ is the summation of all compared bits which correlate, and (7) $\epsilon_o$ is the worst case bit error rate expected of the received data stream.

If the inequality fails at the lower limit $L_1$ then the selected group is rejected not being the synchronization pattern, whereas, if it fails at the upper limit $U_1$, then the group is accepted as the synchronization pattern.

A feature of the present invention resides in its inherent speed of decision which is coupled with a high probability of it making the correct decision.

Another feature of the invention resides in the fact that it is amenable to be embodied in a completely digital apparatus which requires no analog functions.

Another feature of a synchronizer in accordance with the invention is that should the noise content of an incoming data stream diminish the probability that the synchronizer will make the correct decision will improve.

The invention itself, both as to its organization and method of operation, as well as additional objects and advantages thereof, will become more readily apparent from a reading of the following description in connection with the accompanying drawings in which:

FIG. 4 depicts a logic table which shows the various operating states of the block elements shown in FIGS. 2 and 3.

In accordance with the invention, the problem of determining whether or not a selected group of data bits is in fact a synchronization pattern is recognized as being a statistical problem. This invention makes use of the sequential probability ratio test which may be defined by the following inequality:

(8)           $\dfrac{\beta_o}{1-\alpha_o} < \dfrac{P_{\text{in}}}{P_{\text{on}}} < \dfrac{1-\beta_o}{\alpha_o}$ Here $\beta_o$ and $\alpha_o$ are defined above in connection with inequality (1), and $P_{\text{in}}$ is the probability that a hypothesis $H_1$ is true $n$ samples and $P_{\text{on}}$ is the probability that an alternate hypothesis $H_o$ is true after $n$ samples are taken.

In accordance with inequality (8), if the probability ratio after the $n$th sample equals or exceeds $$\left(\frac{1-\beta_o}{\alpha_o}\right)$$

then the hypothesis $H_1$ is accepted. Similarly, if the probability ratio is less than or equal to $$\left(\frac{\beta_o}{1-\alpha_o}\right)$$

then the hypothesis $H_1$ is rejected and the second hypothesis $H_o$ is accepted. In accordance with the invention, inequality (8) is modified so as to be in the form of inequality (1); which need not be repeated herein in an attempt to simplify this disclosure.

Now viewing inequality (1), as the bits of a pattern are serially checked, on a bit-by-bit basis, if a counter is advanced one count, for each corresponding bit pair and decreased K counts for each incorrect bit pair, eventually the inequality will fail. If the upper limit $U_1$ is equalled or exceeded, then the group will be recognized as the synchronization pattern; whereas, if the lower bound is equalled or exceeded, the sample or selected group will be rejected and a new group of data bits selected to be tested.

Inequality (1) may be modified further by assuming that $\alpha_0 = \beta_0$, which implies that $U_1$ equals $-L_1$. Still further, the term K may be chosen to the nearest integer value, and thus the implementation of an apparatus in accordance with the invention may be greatly facilitated. For a specific example, for a bit error rate $\epsilon_0$ of 8%, assuming $\alpha_0 = \beta_0$, the upper and lower limit may be selected as $+12$ and $-12$ respectively, which are in fact correct only to the nearest integer values. The nearest integer constant K for this example is $-3$.

Figure 1:
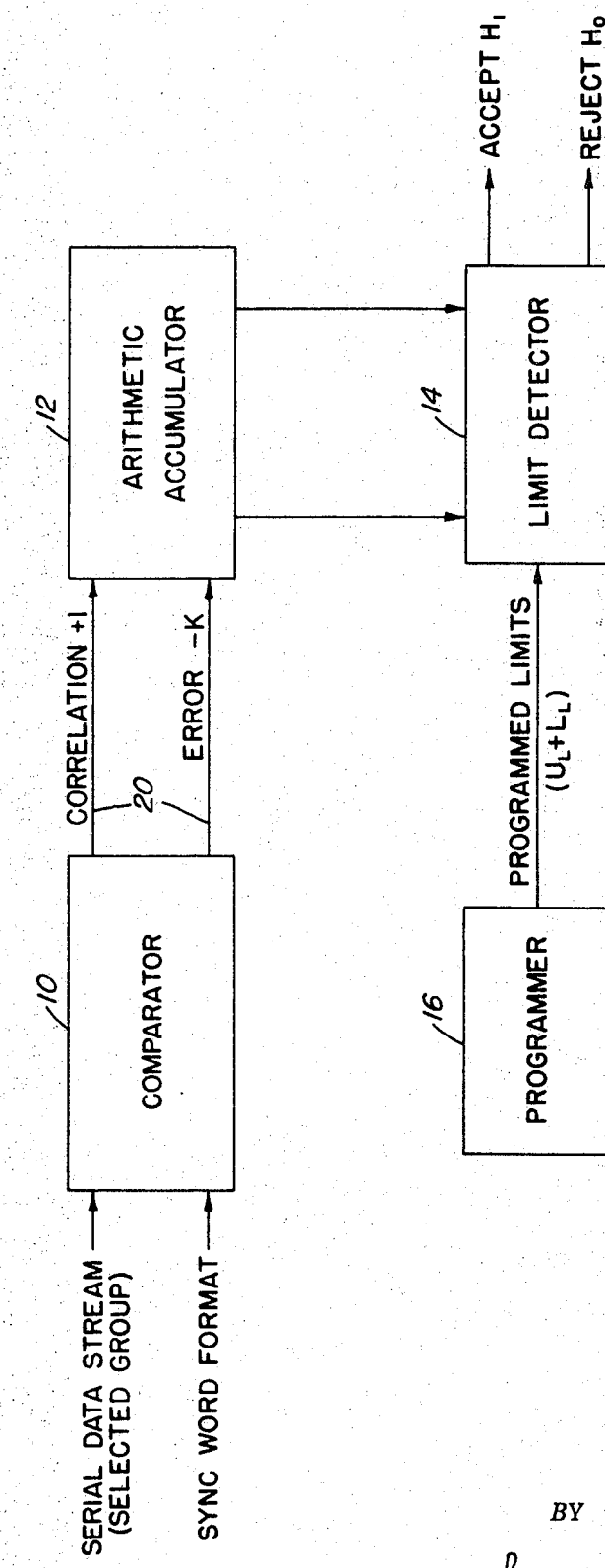
FIG. 1 is a generalized block diagram of a synchronizing system in accordance with the present invention.

Turning now to the synchronizer shown in FIG. 1, and applying the figures from the above example, a comparator 10 compares the sync signal format against that of a selected group of data bits from a data stream and for each bit pair that corresponds delivers, on a bit-by-bit basis, a single count signal to an arithmetic accumulator 12, whereas, for each indicated error signal indicates to the accumulator to add the number $-3$. Now if the upper limit of $+12$ is reached or exceeded, a limit detector 14 (programmed with limits $U_1$ and $L_1$) generates, an accept signal $H_1$. On the other hand, if the lower limit $-12$ is reached or exceeded (in a negative sense), a reject decision $H_0$ will be made. The accumulator as shown is programmed with the appropriate upper and lower limits by means of a programmer 16.

The selected integer values may be varied somewhat from the nearest integer numbers and the invention still may be practiced. For instance, in a modification of the above example with the same bit error rate $\epsilon_0$ of 8%, the upper limit may be held at $+12$, while the lower limit may be selected as $-13$ to reduce the number of logic elements needed to practice this invention, as will be explained later.

Figure 2:
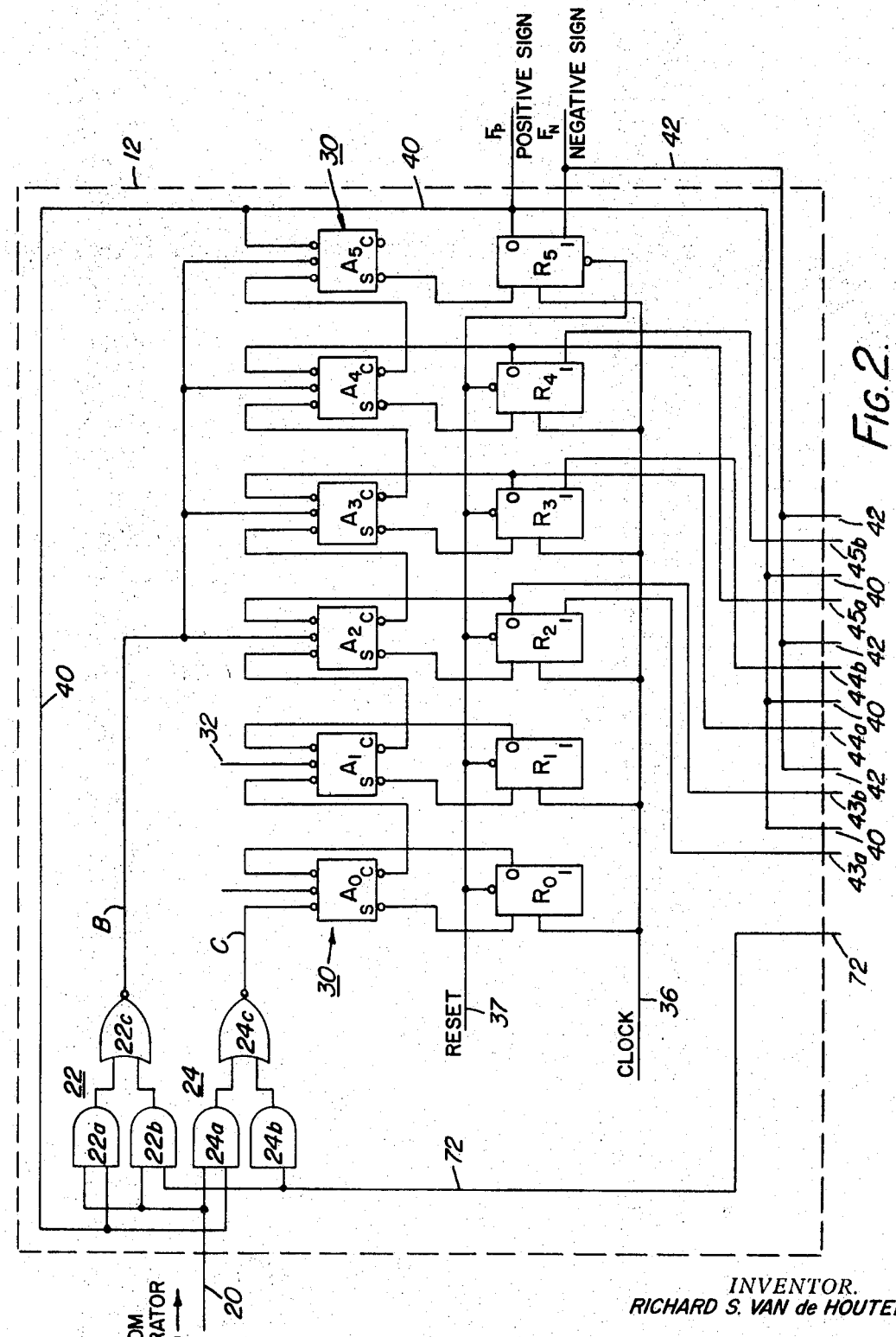
FIGS. 2 and 3 are a more detailed block diagram of the various block elements shown in FIG. 1.
Figure 3:
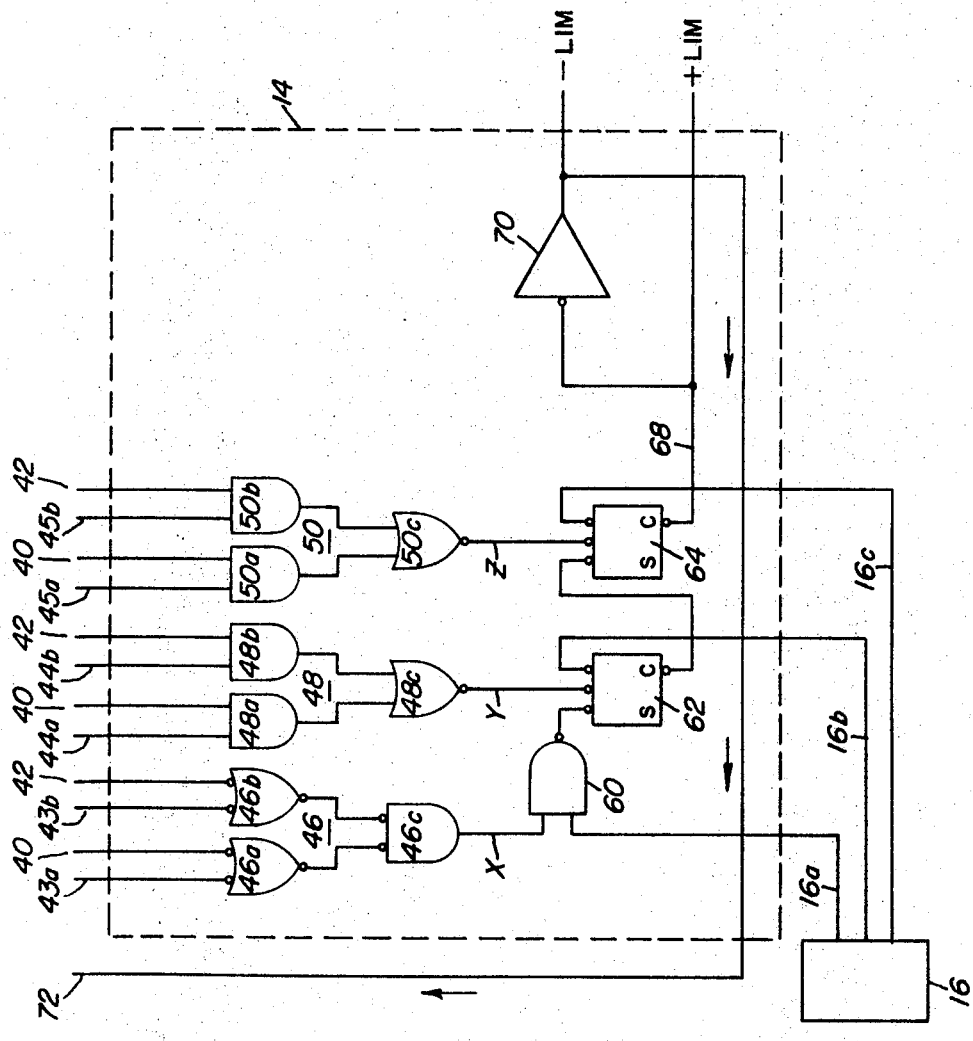

The system shown in FIGS. 2 and 3 basically depict the details of a version of the accumulator 12 and the limit detector 14 (in accordance with the invention) which statistically verifies probable sync locations using the criteria of the modified example, just mentioned. The symbols or blocks employed in FIGS. 2 and 3 are those recommended for use by the American Standards Institute, ASA Y32.14 (1962), and they are published by the American Institute of Electrical Engineers in AIEE Pamphlet No. 91, Graphic Symbols for Logic Diagrams (May 1966). It should be noted at the outset that the illustrated system employs elements which use positive logic, that is to say a high voltage level represents a 1-state, whereas a low voltage level represents the 0-state and also negative logic which is just the reverse namely the high voltage level is the 0-state whereas the low voltage level is the 1-state. The logic elements which employ negative logic are shown in accordance with the above American Standard with circles —0— at their inputs or outputs.

Turning now to FIG. 2, the accumulator 12 performs the arithmetic operations required for counting bits which correspond. In this system, the weighting values are:

Bit pairs that correspond = $+1$
Bit pairs that do not correspond $(K) = -3$
Limits of $+12(U_1)$ and $-13(L_1)$ Control of the number to be added to the accumulator is exercised by the AND-OR gates 22 and 24. Both the gates 22 and 24 have two AND gates with subscripts $a$ and $b$ and an OR gate with a subscript $c$. A lead 20 from the comparator 10 provides a first input to AND-OR gate 22 and a second input to AND-OR gate 24. The arrangement is such that when there is a high level signal or voltage impressed on the lead 20, it represents that the comparator 10 has detected that a bit pair does not correspond or is in error (K): whereas if the level on the line 20 is low, it signifies that the bit pair has been found to correspond $(+1)$. The operation of the AND-OR gates 22 and 24 are perhaps best understood with reference to the following Truth Table:

TRUTH TABLE I
(Gates 22 and 24)

| Input | | | Output | |
| --- | --- | --- | --- | --- |
| 20 | 40 | 72 | B | C |
| 0 | 0 | 0 | 1 | 1 |
| 0 | 1 | 0 | 1 | 1 |
| 1 | 1 | 0 | 0 | 1 |
| 1 | 0 | 0 | 0 | 1 |
| 0 | 0 | 1 | 1 | 1 |
| 0 | 1 | 1 | 0 | 0 |
| 1 | 1 | 1 | 0 | 0 |
| 1 | 0 | 1 | 0 | 0 |

Where 0 is a high voltage level and 1 is a low voltage level.

Inasmuch as the signals carried by the leads 40 and 72 have not yet been explained, suffice here to say that whenever the accumulator 12 is between the limits $U_1$ and $L_1$ and the line 20 has a high level signal (0) impressed thereon, the output of the AND-OR gate 22 (at point B) will be low, wihich in negative logic represents the 1-state, and the output of the AND-OR gate 24 (at point C) will be also low (1-state). Note all the combinations of Table I where both B and C are at the 1-state. On the other hand, if at this time the line 20 should carry a low level signal (1-state), signifying a bit pair comparison, the output at point B will be high (0-state) and the output at point C will be low (1-state). Table I should be more closely studied after the signals carried by the leads 40 and 72 have been explained.

From point B the AND-OR gate 22 provides inputs to stages $A_2-A_5$ of ADDER 30; whereas point C is connected so as to provide only a single input to the stage $A_0$ of the ADDER 30 from the AND-OR gate 24. The second stage $A_1$ of the ADDER 30 is provided with an input 32 which is at a constant high voltage level, thus signifying a 0-state.

It is well to note the numerical significance of the outputs B and C and the input 32. As noted earlier, bit pairs that correspond were assigned a value of $+1$. Written in the base 2 number system, this is $+00001$. Bit pairs that do not correspond were assigned a value $-3$. Written in the base 2 number system, this is $-00011$. The act of subtraction may be performed by adding the twos complement of the number to be subtracted. Employing this technique, a $-3$ becomes 11101. In binary arithmetic, an additional digit may be added (in the most significant digit location) and positive and negative numbers may be assigned arbitrary values in the most significant digit to determine the correct sign value of two added numbers. Arbitrarily then, all positive numbers are assigned with a 0-state in the most significant digit location and all negative numbers are assigned with a 1-state in the most significant digit position. (See also FIG. 4.) This results in $(+1)$ being represented as 000001 and $(-3)$ being represented as 111101.

Accordingly, when the accumulator 12 holds accumulation between the limits $U_1$ and $L_1$ and a low signal is impressed upon the line 20, a binary number 000001 $(+1)$ is provided as an input to the ADDER 30, whereas when a high signal is impressed upon the line 20, the binary number 111101 $(-3)$ is provided as an input to the ADDER 30, remembering, of course, that the ADDER 30 works in negative logic.

The accumulator 12 is also provided with a series of flip-flop logic elements $R_0$–$R_5$ each one of which corresponds to and monitors a separate stage of the ADDER 30 (which stage carries the same subscript as its associated R element). The operation of the element $R_0$ need only be explained as all "R" elements are identical in construction. When a clock pulse is provided by a lead 36 as a triggering input to the flip-flop $R_0$, it permits the flip-flop $R_0$ to accept the signal from the output of its corresponding stage $A_0$ in the ADDER 30. The flip-flop $R_0$ is normally set so that its zero output is high. If at this time the output from the stage $A_0$ is low (1-state), the 0-output side of the flip-flop $R_0$ will toggle from a high to a low output, but if the output of the stage $A_0$ is high, it will remain in a high condition. The results of this operation are that the ADDER stages $A_0$–$A_5$ sum is stored in flip-flops $R_0$–$R_5$ respectively. The output of the storage flip-flops $R_0$–$R_5$ are respectively fed back to the adder inputs to be added with the next comparator 10 value.

Turning now to FIG. 4 there is shown a Truth Table (in positive logic) for the elements $R_0$–$R_5$. This table when read in conjunction with FIG. 2 shows that when the 0-side output of the stage $R_5$ is high, the storage flip-flops $R_0$–$R_5$ will hold a positive number, whereas when its 1-side is high, the storage flip-flops $R_0$–$R_5$ hold a negative number. Through the lead 40 the 0-side of the stage $R_5$ provides an input to the AND–OR gates 22 and 24 and also provides inputs to the limit detector 14 shown in detail in FIG. 3.

The limit detector 14 monitors stages $R_2$–$R_4$ and in addition receives inputs from the stage $R_5$ through the lead 40 and a lead 42 connected to the 1-side of the stage $R_5$. More particularly, there are a group of logic elements 46 (a, b, and c) which monitors the stage $R_2$ receiving inputs through the leads 43a and 43b, a group of logic elements 48 (a, b, and c) which monitor the stage $R_3$ receiving inputs through leads 44a and 44b, and a group of logic elements 50 (a, b, and c) which monitor the stage $R_4$ receiving inputs through the leads 45a and 45b. Briefly returning to the Truth Table of FIG. 4, it shows that the outputs X, Y, and Z (respectively from the gates 46, 48, and 50) hold the same binary number for the numbers +12 or −13. Because of this symmetry and in accordance with the invention, the upper limit was chosen to be at +12 rather than +13. By means of this arrangement the logic is greatly simplified. It should be noted that the binary number represented by the outputs X, Y, and Z is the complement of the binary number held in the states $R_2$–$R_4$.

The function of the limit detector 14 is of course to determine if the accumulated value contained in the "R" storage flip-flops is equal to or greater than the programmed limits $U_1$ or $L_1$. Arithmetically, the limit detector 14 need only subtract the two following values:

minuend (program limits $U_1$ and $L_1$ which correspond to quantities held in stages $R_2$–$R_4$)
+ complement of subtrahend (complement of number in stages $R_2$–$R_4$) held at points X, Y and Z
= difference There will always be an end-around carry, except if the subtrahend is equal to or greater than the minuend. Then and only then will there be no end-around carry. This mathematical relationship is employed (as set forth hereinafter) to determine when $U_1$ and $L_1$ are reached.

Now returning to FIG. 3, the programmer 16 provides inputs through leads 16a, 16b and 16c (minuend) respectively. The leads 16a, b and c are respectively connected to AND gate 60 and Full adders 62 and 64. The gates 60, 62 and 64 are also respectively connected to the points X, Y and Z (subtrahend complement). The output of gate 64 carried by the lead 68 (end-around carry output) is normally low and will only turn high when the outputs at points X, Y and Z corresponding to the numbers +12 or −13 has been reached or exceeded. This result occurs in accordance with the previously described mathematical relationship. (See also the Truth Table of FIG. 4). The lead 68 provides an input to an inverter 70, the output to which is fed back to each of the exclusive OR gates 22 and 24. The operation of the gates 22 and 24 should now be re-read and the Truth Table I for these gates will be completely understood.

The limit detector 14 can be readily adjusted to check for other limits than +12 and −13. The following table shows clearly that by merely changing the output signal levels from the programmer 16 the limit detector 14 will search for different limits.

TABLE II

| Input (leads) | | | Program Limits | |
|---|---|---|---|---|
| 16a | 16b | 16c | $U_1$ | $L_1$ |
| L | H | L | +12 | −13 |
| H | L | H | +16 | −17 |
| L | L | H | +20 | −21 |
| H | H | H | +24 | −25 |
| L | H | H | +28 | −29 |
| L | L | L | +4 | −5 |
| H | H | L | +8 | −9 |

Where H is a high voltage signal impressed upon a lead and L is a low voltage signal impressed upon a lead.

Whenever the output of the gate 70 switches from a high to a low level (see FIG. 4) the synchronizer will either accept or reject the selected group of bits which has been compared in the comparator 10. The pattern is accepted as ($H_1$) when −LIM is low and $F_p$ is high or rejected ($H_0$) when −LIM is low and $F_n$ is high.

An important feature of the invention is that when the rejected decision ($H_0$) is reached, the combination of a low level on line 72 and a low level on line 40 will disable the gates 22 and 24 causing their outputs at points B and C to go to a high voltage state. In such an instance a binary "0" is continuously supplied to the ADDER 30 preventing accumulating, thereby causing the accumulator value to remain at ($H_0$). Truth Table I for the gates 22 and 24, shown above, clearly illustrate this feature. The flip-flop 40 should now be reset to a zero so that a new stream of data bits may be sampled when desired.

Another important feature of the invention is that after the accepted decision ($H_1$) is reached, the inputs through leads 72 and 40 will disable the gates 22 and 24 from injecting the binary number (+1) into the ADDER 30. This prohibits arithmetical overflows in the positive direction past the limit $U_1$. The synchronizer if it now is to verify the sign word of the next position of the recurring sync pattern must count down from +$U_1$ to $L_1$ to reject this newly selected group of data bits. It follows then that after a selected group of data bits has been accepted as the sync pattern, the limit for rejection of the next group of sync bits is effectively doubled. At this time the only meaningful limit is $L_1$ and if it is not reached, the group of data bits is selected. The advantage of this feature is seen by this example. Suppose the selected group of data bits (after the accepted decision $H_1$) is the correct pattern but a portion of which has been transmitted in an unusually noisy environment. This feature will reduce the probability of rejecting this correct pattern.

Briefly reviewing the operation of the illustrated synchronizer, the comparator 10 checks a selected group of data bits against a synchronization pattern on a bit-by-bit basis, and for each comparison injects either the quantity (+1) into the ADDER 30 or the negative quantity K (see inequality 3) into the ADDER 30. When a count is accumulated which is at least equal to an upper limit or bound $U_1$ (see inequality 4) or a lower limit $L_1$ (see inequality 2), the limit detector 14 signals that the group of data bits is the synchronizing pattern ($U_1$ being reached) or that the group is not the synchronization pattern ($L_1$ being reached).

While an embodiment of the invention has been described, variations thereof and modifications therein within the spirit of the invention will undoubtedly suggest themselves to those skilled in the art. Hence inasmuch as it is well understood, the term pattern encompasses numerous other situations than a single specific code, those skilled in the art will appreciate that the decision technique of the present invention can also be used to differentiate two different random sequences so commonly found in PCM data transmission, which sequences differ in their probability of error (i.e., $\epsilon_1 + \epsilon_2$). Moreover, although the comparator 10 has been described as comparing one bit pair at a time, it will be appreciated by those in the art that other comparators can be implemented which act on groups of bits and suitably increment an accumulator with a composite added quantity. Accordingly, the foregoing description should be taken as illustrative and not in any limiting sense.

What is claimed is:

1. In a data transmission system for receiving a stream of data information with a bit error probability of $\epsilon_o$, said data stream being interspersed with recurring groups of sync bits having a predetermined format, means for identifying the bits in said data stream which constitute said sync bit group comprising:
   (a) means for comparing in a bit-by-bit fashion a selected group of said bits and a group of bits in said predetermined sync signal format and generating a first signal for each pair of bits which corresponds and a second signal for each pair of bits which does not correspond,
   (b) an accumulator having means for accumulating a first count for each said first signal, and a second count (K) for each said second signal wherein K is substantially equal to $$\frac{\ln 2\epsilon_o}{\ln 2(1-\epsilon_o)}$$

and,
   (c) means responsive to the total count in said accumulator which is equal to a predetermined first number for signaling that said selected group is said sync group and a second predetermined number indicating that said selected group is not said sync group, and wherein said first and second numbers are functions of said bit error rate and said first number is greater than said second number.

2. The invention as set forth in claim 1 wherein said first number is substantially equal to:

$$U_1 = \frac{\ln\left(\frac{1-\beta_o}{\alpha_o}\right)}{\ln 2(1-\epsilon_o)}$$

and said second predetermined number is substantially equal to $$L_1 = \frac{\ln\left(\frac{\beta_o}{1-\alpha_o}\right)}{\ln 2(1-\epsilon_o)}$$

with $\alpha_o$ and $\beta_o$ being respectively the probability that the system will erroneously indicate that pattern being tested will be erroneously accepted or rejected.

3. In a data transmission system for receiving sync signals transmitted with a bit error rate of $\epsilon_o$, means for determining whether or not a selected group of data bits is said sync signal comprising:
   (a) comparison means comparing said sync bit format with said bits of said selected group for generating a first signal for each said bit pair which corresponds and a second signal for each said bit pair which does not correspond,
   (b) counting means for accumulating the number $+1$ for each said first signal and subtracting the number $K$ for each said second signal, and
   (c) limit detector means responsive to the accumulation in said counting means of a first count $U_1$ for indicating that said selected group is said sync bit and a second count $L_1$ indicating that said selected group is not said sync bits in accordance with the following inequality:

$$L_1 < \Sigma I + K\Sigma J < U_1$$

wherein $L_1$ is substantially equal to $$\frac{\ln\left(\frac{\beta_o}{1-\alpha_o}\right)}{\ln 2(1-\epsilon_o)}$$

$K$ is substantially equal to $$\frac{\ln 2\epsilon_o}{\ln 2(1-\epsilon_o)}$$

$U_1$ is substantially equal to $$\frac{\ln\left(\frac{1-\beta_o}{\alpha_o}\right)}{\ln 2(1-\epsilon_o)}$$

$\Sigma J$ is the summation of all the compared bits in error
$\Sigma I$ is the summation of all compared bits which correlate with $\alpha_o$ and $\beta_o$ being respectively the probability that the system will erroneously indicate that pattern being tested will be erroneously accepted or rejected.

4. The invention as set forth in claim 3, wherein $L_1$, $K$ and $U_1$ are chosen to have integer values.

5. The invention as set forth in claim 4 wherein $\alpha_o$ is chosen to substantially equal $\beta_o$.

6. The invention as set forth in claim 3 including means responsive to said limit detector means for preventing said counting means from accumulating after said second count $L_1$ is reached.

7. The invention as set forth in claim 3 including means responsive to said limit detector means having recognized said first count ($U_1$) for preventing said counter means from accumulating the said number ($+1$) but permitting it to subtract said number ($K$).

8. Method of selecting by means of an electronic apparatus a group of data bits which has a predetermined format comprising:
   (a) comparing input data bits against a group of bits having said predetermined format on a bit-by-bit basis and generating a first signal having a predetermined logic state for each bit pair that corresponds and a second signal having a logic state complementary to said predetermined logic state for each bit pair that does not correspond,
   (b) accumulating in a counting means the number $+1$ in response to each said first signal and the number $K$ in response to each said second signal until the bounds of the following inequality are equalled or exceeded:

$$L_1 < \Sigma I + K\Sigma J < U_1$$

$L_1$ (lower bound) is substantially equal to $$\frac{\ln\left(\frac{\beta_o}{1-\alpha_o}\right)}{\ln 2(1-\epsilon_o)}$$

$K$ is substantially equal to $$\frac{\ln 2\epsilon_o}{\ln 2(1-\epsilon_o)}$$

$U_1$ (upper bound) is substantially equal to $$\frac{\ln\left(\frac{1-\beta_o}{\alpha_o}\right)}{\ln 2(1-\epsilon_o)}$$

$\Sigma J$ is the summation of all the compared bits in error
$\Sigma I$ is the summation of all compared bits which correlate with $\alpha_o$ and $\beta_o$ being respectively the probability that the system will erroneously indicate that pattern being tested will be erroneously accepted or rejected respectively, and
   (c) selecting said group of input bits when said inequality fails at said upper bound, (d) rejecting said group of input bits when said inequality fails at said lower bound.

9. The method as set forth in claim 8 including the step of after having recognized said first count ($U_1$) preventing said counter means from accumulating said number (+1) but permitting it to subtract said number (K).

10. In a data transmission system for receiving signals transmitted with a bit error rate of $\epsilon_0$, means for determining whether or not a selected group of data bits is said sync signal comprising
 (a) comparison means comparing said sync bit format on a bit-by-bit basis with said bits of said selected group for generating a first signal for each said bit pair which corresponds and a second signal for each said bit pair which does not correspond,
 (b) an arithmetic accumulator having:
  (i) counting means having an ADDER for accumulating the number +1 for each said first signal and subtracting the number K for each said second signal, and
  (ii) gating means for monitoring the ADDER determining the accumulated count held by the ADDER, and
 (c) limit detector means coupled to said gating means having means responsive to the accumulation in said counting means of a first count $U_1$ for indicating that said selected group is said sync bits and a second count $L_1$ indicating that said selected group is not said sync bits in accordance with the following inequality:

$$L_1 < \Sigma I + K\Sigma J < U_1$$

wherein $L_1$ is substantially equal to $$\frac{\ln\left(\frac{\beta_0}{1-\alpha_0}\right)}{\ln 2(1-\epsilon_0)}$$

K is substantially equal to $$\frac{\ln 2\epsilon_0}{\ln 2(1-\epsilon_0)}$$

$U_1$ is substantially equal to $$\frac{\ln\left(\frac{1-\beta_0}{\alpha_0}\right)}{\ln 2(1-\epsilon_0)}$$

$\Sigma J$ is the summation of all the compared bits in error
$\Sigma I$ is the summation of all compared bits which correlate
with $\alpha_0$ and $\beta_0$ being respectively the probability that the system will erroneously indicate that pattern being tested will be erroneously accepted or rejected.

11. The invention as set forth in claim 10 including AND-OR gates disposed between said comparator and said arithmetic accumulator and including means responsive to said limit detector means for preventing said ADDER from accumulating after said second count ($L_1$) is reached.

12. The invention as set forth in claim 11 wherein said AND-OR means includes means responsive to said limit detector means having recognized said first count ($U_1$) for preventing said ADDER from accumulating said first number for permitting it to subtract said second number (K).

13. The invention as set forth in claim 10 including program adjustable means for programming said limit detector with said first and second numbers.

14. The invention as set forth in claim 13 wherein said first count is selected to be the integer +12 and said second count is selected to be the integer −12.

References Cited

UNITED STATES PATENTS

| | | | |
|---|---|---|---|
| 3,069,498 | 12/1962 | Frank | 178—69 |
| 3,069,504 | 12/1962 | Kaneko | 179—15 |
| 3,144,515 | 8/1964 | Kaneko | 179—15 |
| 3,251,034 | 5/1966 | Goode et al. | 340—146.1 |
| 3,317,669 | 5/1967 | Ohnsorge | 178—69.5 |

EUGENE G. BOTZ, Primary Examiner

C. E. ATKINSON, Assistant Examiner

U.S. Cl. X.R.

340—149; 178—69.5; 179—15